Patented Sept. 28, 1954

2,690,466

UNITED STATES PATENT OFFICE 2,690,466

SUBMERSIBLE VENT CAP FOR STORAGE BATTERIES

Thomas L. Kendall and John E. Heritage, Muncie, Ind., assignors to General Motors Corporation, Detroit, Mich., a corporation of Delaware Application October 17, 1951, Serial No. 251,678

3 Claims. (Cl. 136—178)

1

This invention relates to vent caps for storage batteries and is particularly concerned with the submersible type of vent caps which will permit submerging of the battery without damage thereto.

The main feature of the invention is, therefore, to provide a storage battery vent cap for a battery cell which will permit egress of gases from the cell but which will prevent ingress of air, water or the like into the cell whereby the cell may be submerged without harming its future function.

Another feature of the invention is to provide a vent cap having a valving means therein which is readily opened to permit the egress of gases from the battery but which is closed by gravity to prevent ingress of fluids external of the battery, this valving means being freely movable within the vent cap and limited in its opening movement by portions of the vent cap.

Additional features, advantages and improvements of the present invention will be apparent from the following description, reference being had to the accompanying drawings, wherein preferred embodiments of the invention are clearly shown.

Storage batteries, as used commercially, normally include a plurality of cell containers that are each closed by a vent cap. These vent caps permit escape of gases formed during charging of the battery whereby the internal pressure within each cell is maintained at substantially atmospheric pressure. In marine applications, and for that matter in numerous other applications, storage batteries are often subjected to submersion in water due to the fact that the vehicle in which they are contained is submerged. When this occurs, water seeps into the cells through the vent of the conventional type of cap. The feature of the present invention is to provide a vent cap which will permit submersion of a storage battery cell without permitting the harmful ingress of external fluids into the cell, which vent cap, will, however, allow venting of the cell to prevent excessive gas pressure from forming therein. Furthermore, the present vent cap, as described herein, is applicable for use in connection with any type of storage battery since the cap is of a screw variety and is interchangeable with the standard type of conventional vent cap.

2

Figure 1:
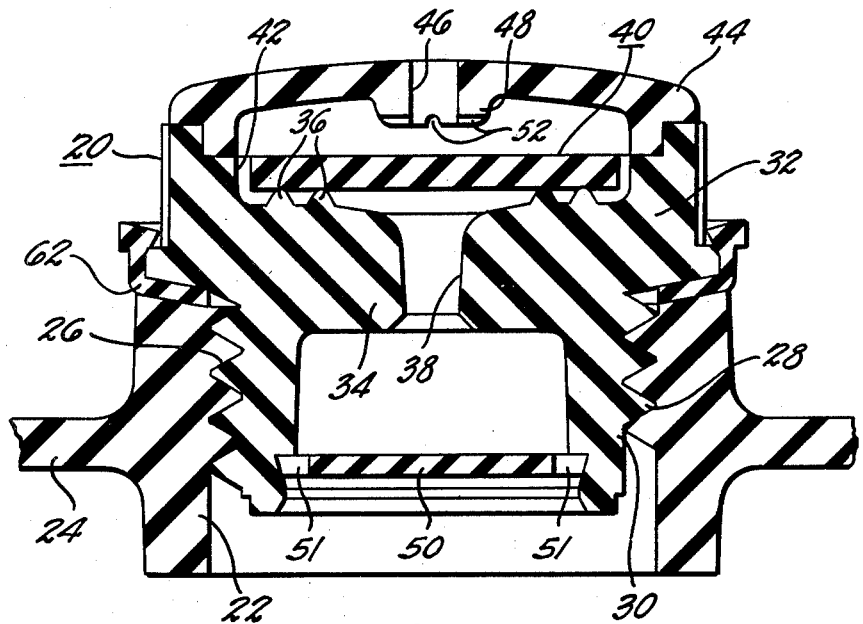
Fig. 1 is a cross sectional view of one embodiment of the invention.

Referring specifically to Fig. 1, one embodiment of the invention is shown wherein a vent cap 20 is shown assembled to a threaded filler opening 22 of a battery cell casing 24 (shown in part). The filler opening 22 is threaded at 26 to engage threads 28 preferably molded into a plug or skirt portion 30 of the cap. A main body portion 32 is provided on the cap which presents a cross wall 34 that separates the cap 20 into two compartments, one formed by the elongated threaded portion 30 and the other formed by the body portion 32. The upper face of the wall 34 includes at least one and preferably two annular seats 36 which surround an aperture 38 that passes through the wall 34. A valve plate 40 is provided which is preferably circular in shape and has less diameter than the cavity 42 formed in the body portion 32. The valve disc 40 is of such diameter that at no time can it be displaced from engagement with the seats 36 but it is also of less diameter than the cavity 42 so that it is freely movable therein. The cavity 42 is closed by a cap 44 apertured at 46 to provide a vent. This cap either is press-fitted or cemented to the body portion 32 to prevent accidental removal. The aperture 46 includes an inwardly extending flange 48 that extends downwardly in cavity 42, a distance sufficient to act as a stop for the valve disc 40 to prevent it from becoming jammed or cocked within the cavity 42. The threaded portion or skirt 30 is closed at its lower end by an apertured disc or baffle 50. This disc is used to baffle spray so that no direct spray enters the aperture 38, although gases may freely pass through the apertures 51 in the disc 50 which are either notches in the edge or holes drilled out of line with the aperture 38. Baffle 50 is press-fitted into the skirt portion 30 so that it preferably snaps into a groove and is held in place therein.

In operation, when gas is formed within the battery cell, it passes through the apertured baffle 50 and aperture 38 in the cross wall 34 whereupon when the pressure is sufficient, the valve disc 40 is lifted off the seats 36 to permit the gas to escape around the valve disc 40 and out of the vent 46. In this connection, it will be noted that the annular flange 48 around the vent 46 is grooved as at 52 to prevent the sealing of the aperture 46 by the disc 40 in the event that extreme pressures are built up within the battery which would lift the disc 40 into full engagement with the flange 48. Normally, however, the disc merely lifts on one side or the other to permit the gases to emit from the cell.

The double seats 36 are preferably used to insure sealing of the cell against ingress of water, etc. In this connection, a single seat may be used or more than two seats may be used as desired. When the battery is submerged and water passes through the vent 46 into the cavity 42, the valve disc 40 seals against the annular seats 36 to prevent the water from passing into the cell. The disc 40 is made from a suitable material having a density greater than that of water so that the disc 40 will not have a tendency to float but will at all times remain in seated position. When the battery is removed from the water, it is preferred to remove the valve caps and shake the water therefrom to prevent the same from leaking into the cell upon opening of the valve disc 40 due to gas pressure.

The disc 40 is completely free within the cavity 42. It is not guided in any way other than by the clearance between the diameter of the disc and the inner diameter of the cavity, which clearance is not sufficient to permit the disc becoming misaligned with the seats 36. Finally the annular rim or flange 48 extends sufficiently into the cavity 42 to prevent the disc 40 from becoming cocked or jammed at any time.

It will be noted therefore that the construction is not only simple but very inexpensive, requiring no precision parts which cannot be adequately formed during the molding operation.

Figure 2:
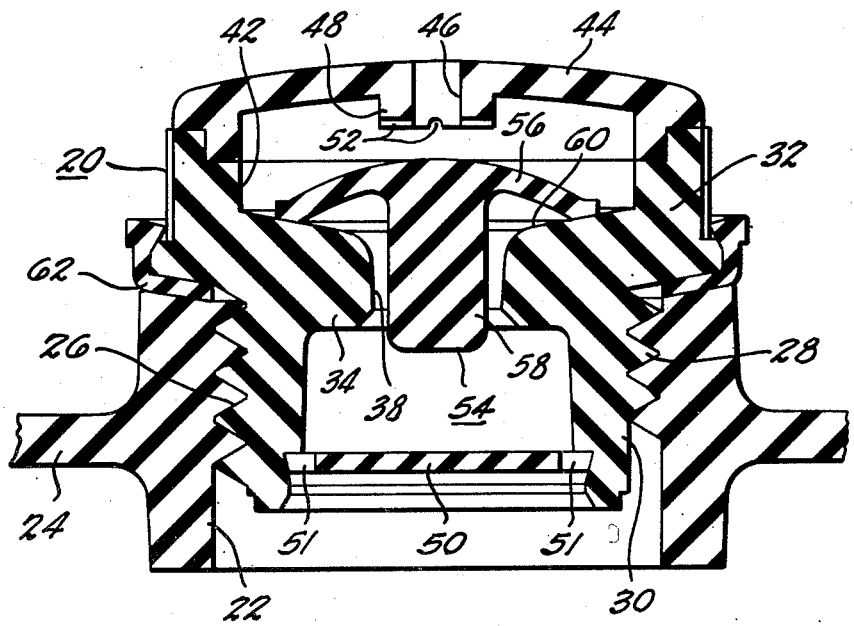
Fig. 2 is a cross sectional view of a second embodiment of the invention.

Fig. 2 shows another embodiment of the invention which is substantially similar to that shown in Fig. 1 with the exception that the valve seats 36 are omitted and a mushroom type of valve 54 is provided which includes an annular valving head 56 and an elongated stem 58 that extends into the aperture 38. In this connection, the upper wall 60 of the cross wall 34 preferably slopes downwardly on a slight angle and the disc portion 56 of the valve 54 seats therearound.

In this embodiment, the stem 58 has sufficient clearance in the aperture 38 to permit free emission of gases therearound but not sufficient clearance to permit the valve 54 to become misaligned. The annular flange 48 is so dimensioned that the stem 58 of the valve 54 cannot become jammed in the aperture 38 at any time nor can it become disengaged since the flange 48 limits the upward movement of the valve 54. In all other respects, the embodiment shown in Fig. 2 is similar to that shown in Fig. 1 and already described.

It will be noted in both embodiments that an annular gasket 62 is preferably provided to assure sealing of the vent cap 20 to the cell cover 24. Further, in both embodiments, the vent cap may be made from any suitable material, such as, hard rubber, thermosetting resins or it may be made from polyethylene of suitable hardness or, for that matter, any of the conventional materials heretofore used in vent caps, the basic features of the invention being directed to the valving mechanism within the cap rather than to the material or external construction of the cap.

The valve disc 40 and valve 54 are preferably fabricated from a softer material than the remainder of the assembly, suitable elastomers which withstand acid, oxidation and heat are to be used, some of these being, butyl rubber, natural rubber, polyethylene or other plastics, etc., providing they meet the aforementioned requirements.

While the embodiments of the present invention as herein disclosed, constitute preferred forms, it is to be understood that other forms might be adopted.

What is claimed is as follows:

1. A submersible vent cap for use in connection with storage batteries, comprising in combination; a body portion having external threads adapted to be received in a threaded opening in a battery cover, an apertured wall in the interior of said body separating the interior of said body into an upper and lower chamber, said wall being sloped toward said aperture on the upper chamber side thereof for directing fluids from the upper chamber to said lower chamber, a cover for said upper chamber adapted to be secured to the body portion of said cap and having a constantly open vent means therein, a stop means integrally formed on said cover facing toward the upper chambered portion of said cap, a valve in said upper chamber, said valve being dimensioned to have clearance with the internal walls of said upper chamber and limited in its movement without being jammed therein solely by the walls of said chamber, the sloping apertured wall and the stop on said cover, said valve being adapted to seat on a portion of said sloping apertured wall for preventing passage of fluids from said upper to said lower chamber and adapted to unseat therefrom for permitting passage of battery gases through the aperture in said wall to said upper chamber.

2. A submersible vent cap for use in connection with storage batteries, comprising in combination; a body portion having external threads adapted to be received in a threaded opening in a battery cover, an apertured wall in the interior of said body separating interior portions of said body into upper and lower chambers, said wall being sloped toward said aperture on the upper chamber side thereof for directing fluids from the upper to the lower chamber, a cover for the upper chamber, said cover being adapted to be secured to the body portion of said cap and having a constantly open vent means, a stop means integrally formed on said cover facing toward the upper chambered portion of said cap at least one annular ring on said sloping wall circumscribing the apertured opening formed thereon, a valve in said upper chamber, said valve comprising a flat disc dimensioned to have clearance with the internal walls of said upper chamber and limited in its movement without jamming therein solely by the walls of said chamber, the sloping apertured wall, and the stop on said cover, said valve being adapted to seat on the annular ring formed on said sloping apertured wall for preventing passage of fluids from the upper to the lower chambers, and adapted to unseat therefrom for permitting passage of battery gases through the aperture in said wall to said upper chamber.

3. A submersible vent cap for use in connection with storage batteries, comprising in combination; a body portion having external threads adapted to be received in a threaded opening in a battery cover, an apertured wall in the interior of said body separating interior portions of said body into upper and lower chambers, said wall being sloped toward said aperture on the upper chamber side thereof for directing fluids from the upper to the lower chamber, a cover for the upper chamber, said cover being adapted to be secured to the body portion of said cap and having a constantly open vent means, a stop means integrally formed on said cover facing toward the upper chambered portion of said cap, a valve in said upper chamber, said valve consisting of a substantially circular valve disc having a circular stem attached thereto, said stem passing through the aperture in said sloping wall with sufficient clearance to permit gasses to pass therearound, said disc portion of said valve being dimensioned to have clearance with the internal walls of said upper chamber, said valve being limited in its jam free movement in the upper chamber solely by the walls of said chamber, the sloping apertured wall and the stop on said cover, said valve being adapted to seat on a portion of the said sloping apertured wall for preventing passage of liquid from said upper to said lower chamber and adapted to unseat therefrom for permitting passage of battery gases through the aperture in said wall to said upper chamber.

References Cited in the file of this patent

UNITED STATES PATENTS

| Number | Name | Date |
| --- | --- | --- |
| 525,883 | Brisco | Sept. 11, 1894 |
| 1,190,654 | Kammerhoff | July 11, 1916 |
| 1,992,151 | Woodbridge | Feb. 19, 1935 |
| 2,088,543 | Woodbridge | July 27, 1937 |
| 2,113,454 | Mitchell | Apr. 5, 1938 |
| 2,185,097 | Woodbridge | Dec. 26, 1939 |
| 2,351,177 | Younkman | June 13, 1944 |
| 2,571,893 | Kendall | Oct. 16, 1951 |